US011529667B2

(12) United States Patent
Suzuki

(10) Patent No.: US 11,529,667 B2
(45) Date of Patent: Dec. 20, 2022

(54) PLATE MATERIAL, FEEDING DEVICE

(71) Applicant: SANKYO SEISAKUSHO CO., Tokyo (JP)

(72) Inventor: Kengo Suzuki, Kikugawa (JP)

(73) Assignee: SANKYO SEISAKUSHO CO., Tokyo (JP)

(*) Notice: Subject to any disclaimer, the term of this patent is extended or adjusted under 35 U.S.C. 154(b) by 882 days.

(21) Appl. No.: 16/462,326

(22) PCT Filed: Nov. 2, 2017

(86) PCT No.: PCT/JP2017/039710
§ 371 (c)(1),
(2) Date: May 20, 2019

(87) PCT Pub. No.: WO2018/096903
PCT Pub. Date: May 31, 2018

(65) Prior Publication Data
US 2019/0366416 A1 Dec. 5, 2019

(30) Foreign Application Priority Data
Nov. 22, 2016 (JP) .............................. JP2016-227151

(51) Int. Cl.
B21D 43/09 (2006.01)
B21C 47/34 (2006.01)
(Continued)

(52) U.S. Cl.
CPC .............. B21D 43/09 (2013.01); B21C 47/34 (2013.01); B65H 20/04 (2013.01);
(Continued)

(58) Field of Classification Search
CPC ........ B21D 43/08; B21D 43/09; B65H 5/062; B65H 20/02; B65H 20/04; B30B 15/30;
(Continued)

(56) References Cited

U.S. PATENT DOCUMENTS 2,260,762 A * 10/1941 Yarrington .............. B21B 31/22
72/248
2,451,833 A 10/1948 Koch
(Continued)

FOREIGN PATENT DOCUMENTS

AU 6482874 A 7/1975
GB 289849 A * 11/1928 ............. B21B 31/28
(Continued)

OTHER PUBLICATIONS

Office Action dated Nov. 26, 2021 in corresponding KR Application No. 10-2019-7014632.
(Continued)

Primary Examiner — Edward T Tolan
(74) Attorney, Agent, or Firm — Harness, Dickey & Pierce, P.L.C.

(57) ABSTRACT

Provided is a plate material feeding device that can achieve reduced power consumption, improve durability, and supply plate material with high precision. A plate material feeding device is provided with a housing, a lower roll, an upper roll, a lower roll support member for supporting the lower roll, an upper roll support member for supporting the upper roll, and a slider movable in the horizontal direction along the upper roll support member, and can feed plate material clamped by the lower roll and the upper roll. A hole is provided in the slider, and a rod is provided in the upper roll support member. By inserting at least part of the rod in the hole in a slidable manner, the upper roll support member can move in the vertical direction when the slider moves in the horizontal direction.

9 Claims, 6 Drawing Sheets

(51) Int. Cl.
  *B65H 20/04* (2006.01)
  *F16H 25/22* (2006.01)
  *F16H 25/24* (2006.01)
(52) U.S. Cl.
  CPC .......... *B65H 2513/51* (2013.01); *F16H 25/22* (2013.01); *F16H 25/24* (2013.01)
(58) Field of Classification Search
  CPC ......... B21B 31/20; B21B 31/22; B21B 31/24; B21B 31/28; B21C 47/34; F16H 25/18; F16H 25/22; F16H 25/24
  See application file for complete search history.

(56) References Cited

U.S. PATENT DOCUMENTS

| | | | | |
|---|---|---|---|---|
| 3,863,823 | A * | 2/1975 | Allred | B65H 20/18 226/142 |
| 4,009,610 | A * | 3/1977 | Hien | B21B 31/28 72/209 |
| 4,852,787 | A * | 8/1989 | Radtke | B65H 20/04 226/149 |
| 5,197,645 | A * | 3/1993 | Nordlof | B21D 43/09 226/154 |
| 5,356,062 | A * | 10/1994 | Kato | B30B 15/30 226/27 |
| 5,808,465 | A | 9/1998 | Gentile et al. | |
| 6,363,823 | B1 * | 4/2002 | Myers | B26D 5/22 83/273 |
| 8,308,036 | B2 * | 11/2012 | Kato | B65H 20/04 226/177 |
| 2007/0044533 | A1 * | 3/2007 | Hofmann | B21B 37/58 72/108 |
| 2007/0193331 | A1 * | 8/2007 | Futamura | B30B 15/0035 72/454 |
| 2009/0108522 | A1 | 4/2009 | Kato | |

FOREIGN PATENT DOCUMENTS

| | | |
|---|---|---|
| JP | S59-135839 U | 9/1984 |
| JP | H04-185950 A | 7/1992 |
| JP | H05-228562 A | 9/1993 |
| JP | 2001165268 A | 6/2001 |
| JP | 2007274826 A | 10/2007 |
| JP | 2008-119699 A | 5/2008 |
| JP | 2009106990 A | 5/2009 |
| JP | 2009270709 A | 11/2009 |
| JP | 2013536086 A | 9/2013 |
| JP | 2015020196 A | 2/2015 |
| KR | 10-2009-0045073 A | 5/2009 |

OTHER PUBLICATIONS

Office Action dated May 11, 2021 in corresponding KR Application No. 10-2019-7014632.
Extended European Search Report dated May 20, 2020 in the corresponding European application (EP 17 87 3191).
CA Office Action dated Jul. 27, 2020 in corresponding CN Application No. 201780072102.6.
International Search Report (in Japanese with English Translation) for PCT/JP2017/039710, dated Dec. 26, 2017; ISA/JP.

* cited by examiner

PLATE MATERIAL, FEEDING DEVICE

CROSS REFERENCE TO RELATED APPLICATIONS

This application is a U.S. National Phase Application under 35 U.S.C. 371 of International Application No. PCT/JP2017/039710 filed on Nov. 2, 2017. This application is based on and claims the benefit of priority from Japanese Patent Application No. 2016-227151 filed on Nov. 22, 2016. The entire disclosures of all of the above applications are incorporated herein by reference.

FIELD

The present disclosure relates to a plate material feeding device that enables low power consumption and durability enhancement and can supply a plate material to, e.g., a press device with high precision.

BACKGROUND

Patent Literature 1 discloses a roll-type material feeding apparatus including a frame, a first driven feed roll, a second feed roll, a first drive motor that rotates in driving engagement with the first driven feed roll, and a second drive motor that rotates in driving engagement with the first driven feed roll. This roll-type material feeding apparatus is equipped with a transmission apparatus so that the second feed roll can be driven in cooperation with the first driven feed roll, and the transmission apparatus includes a first drive gear attached to the first driven feed roll, a first driven gear that is in driving engagement with the first drive gear, and an intermediate coupling member for coupling the first driven gear to the second feed roll. Also, the second feed roll is rotatably supported in a movable roll support, and in order to grip a workpiece between the second feed roll and the first driven feed roll, a force generating actuator provided between the frame and the movable roll support cooperates with the movable roll support to generate a gripping force between the second feed roll and the first driven feed roll.

PATENT LITERATURE

PATENT LITERATURE 1: JP-A-2013-536086

SUMMARY

In the roll-type material feeding apparatus according to Patent Literature 1, the force generating actuator lifts up the movable roll support that supports the second feed roll to release a workpiece gripped between the second feed roll and the first driven feed roll; however, there is the problem of it being necessary to use, e.g., a motor having a large capacity as the force generating actuator in order to lift up the movable roll support.

Accordingly, an object of the present disclosure is to solve the aforementioned problem and provide a plate material feeding device that enables low power consumption and durability enhancement and can supply a plate material with high precision.

According to an aspect of the present disclosure, a plate material feeding device including: a housing; a first roll housed in the housing; a second roll housed in the housing; a first roll support member that supports the first roll; and a second roll support member that supports the second roll, the plate material feeding device enabling a plate material to be clamped by the first roll and the second roll and be transported according to rotation of the first roll and the second roll, includes a slider that is movable in a horizontal direction along one of the first roll support member and the second roll support member, a hole is provided in one of the one roll support member and the slider and a rod is provided in another of the one roll support member and the slider, and at least a part of the rod and the hole slidably engaging with each other enables the one roll support member to move in a vertical direction when the slider moves in the horizontal direction.

According to a specific example of the present disclosure, the plate material feeding device includes a first motor for rotating the first roll, the first motor being joined to the first roll, and a second motor for rotating the second roll, the second motor being joined to the second roll.

According to a specific example of the present disclosure, the plate material feeding device includes a first motor for rotating one roll of the first roll and the second roll, the first motor being joined to the one roll, a first gear provided at a roll shaft with the one roll fixed thereto, and a second gear provided at a roll shaft with another roll of the first roll and the second roll fixed thereto, and the first gear and the second gear engaging with each other enables the another roll to rotate along with rotation of the one roll by the first motor.

According to a specific example of the present disclosure, in the plate material feeding device, each of the first motor and/or the second motor includes a substantially cylindrical stator with a hollow provided therein and a substantially cylindrical rotor with a hollow provided therein, the rotor being disposed in the hollow of the stator.

According to a specific example of the present disclosure, in the plate material feeding device, the hole is a hole including an inclined surface inclined relative to the horizontal direction, and when the slider moves in the horizontal direction, the at least a part of the rod sliding on the inclined surface enables the one roll support member to move in the vertical direction.

According to a specific example of the present disclosure, in the plate material feeding device, the hole is a hole having a shape of a substantially rectangular parallelepiped and the at least a part of the rod is in contact with and slidable on two surfaces of the substantially rectangular parallelepiped, each of the two surfaces being the inclined surface.

According to a specific example of the present disclosure, the plate material feeding device includes a third motor, and in response to rotation caused by the third motor, the slider can move in the horizontal direction.

According to a specific example of the present disclosure, the plate material feeding device includes a screw shaft that rotates in response to rotation caused by the third motor and a nut that engages with the screw shaft, and the nut moving in the horizontal direction along with rotation of the screw shaft enables the slider connected to the nut to move in the horizontal direction.

According to a specific example of the present disclosure, in the plate material feeding device, rolling of a plurality of balls inserted between the screw shaft and the nut enable the slider to move in the horizontal direction.

According to a specific example of the present disclosure, in the plate material feeding device, a coupling unit is provided at a roll shaft with the roll fixed thereto, the roll being supported by the one roll support member, and the one roll support member moving in the vertical direction enables the roll to move in the vertical direction via the coupling unit.

The present disclosure enables a large material gripping force to be obtained with a small drive force and thereby enables provision of a low power consumption plate material feeding device. In particular, a wedge effect obtained by use of inclined surfaces of a hole enables a large material gripping force to be obtained with a small drive force and thus enables a plate material to be clamped and released with small power consumption and also enables durability enhancement compared to conventional techniques. Furthermore, the present disclosure enables a plate material to be clamped and released at high speed and thus enables the plate material to be transported intermittently by increments with high precision.

Other objects, features and advantages of the present disclosure will become apparent from the following description of the embodiments of the present disclosure taken in conjunction with the accompanying drawings.

DRAWINGS

DESCRIPTION

Figure 1:
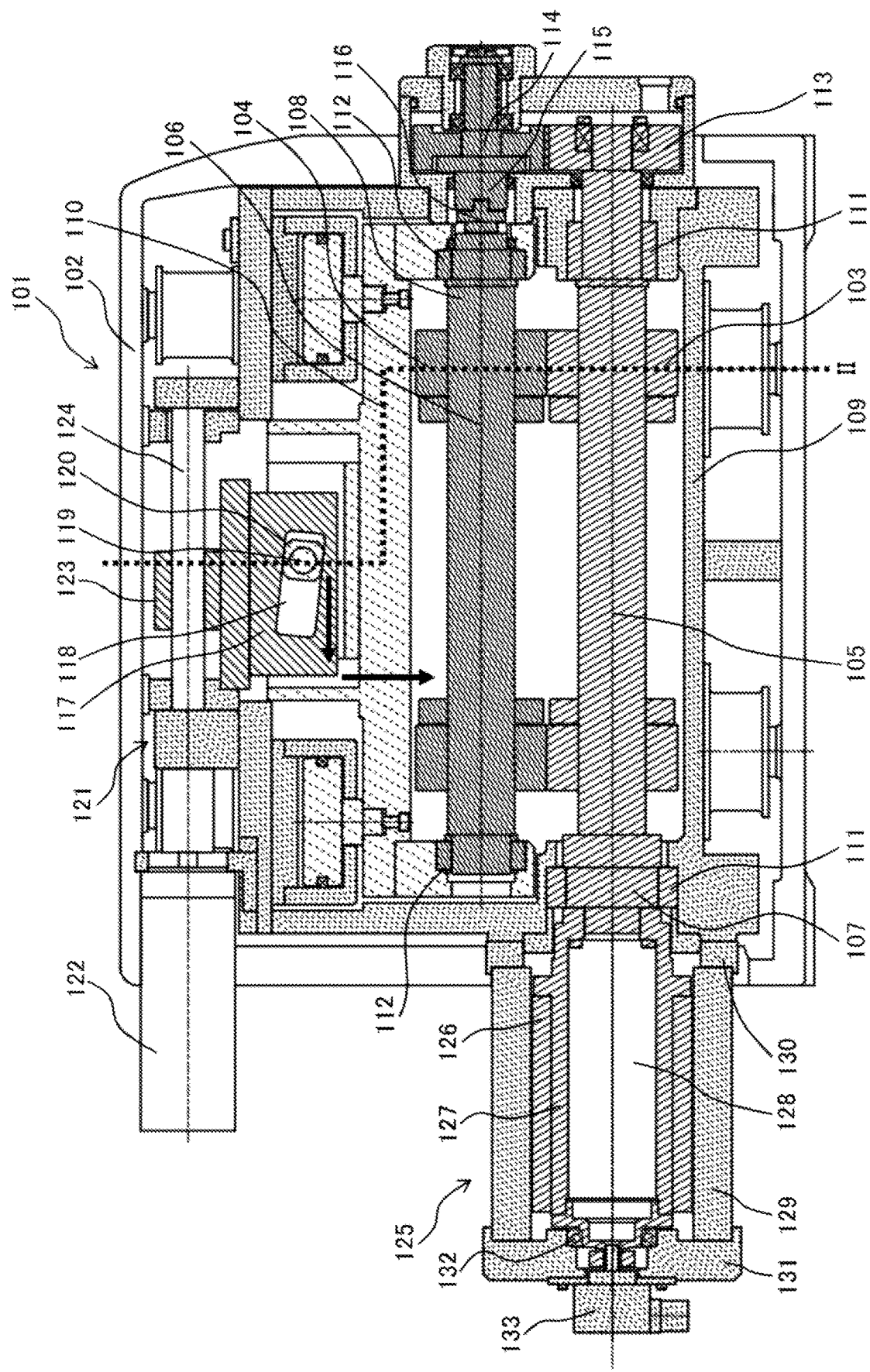
FIG. 1 is a schematic cross-sectional view of a plate material feeding device, which is an embodiment of the present disclosure, when clamping a plate material, as viewed from the front side.

Embodiments of the present disclosure will be described below with reference to the drawings; however, the present disclosure is not limited to these embodiments.

A plate material feeding device 101, which is an embodiment of the present disclosure, will be described with reference to FIGS. 1 to 6. The plate material feeding device 101 includes a body housing 102, one or more first rolls (lower rolls) 103 housed in the body housing 102, and one or more second rolls (upper rolls) 104 housed in the body housing 102 and disposed above the lower rolls 103 in a vertical direction. Also, the plate material feeding device 101 includes a first roll support member (lower roll support member) 109 that is housed in the body housing 102 and rotatably supports the lower rolls 103, and a second roll support member (upper roll support member) 110 that is housed in the body housing 102 and rotatably supports the upper rolls 104. The lower rolls 103 are fixed to a first roll shaft (lower roll shaft) 107 and are rotatable around a first roll axis (lower roll axis) 105, and the upper rolls 104 are fixed to a second roll shaft (upper roll shaft) 108 and are rotatable around a second roll axis (upper roll axis) 106. The lower rolls 103 and the upper rolls 104 come into contact with and clamp a plate material guided by a plate material guide 134, the lower rolls 103 and the upper rolls 104 are rotated and the clamped plate material is thereby transported. The plate material feeding device 101 includes a roll motor 125 that is joined to either rolls of the lower rolls 103 and the upper rolls 104 and rotates the rolls. In the case of FIGS. 1 to 5, the roll motor 125 is joined to the body housing 102 so as to directly rotate the lower rolls 103, but the roll motor 125 may be joined to the body housing 102 so as to directly rotate the upper rolls 104.

The lower roll support member 109 includes lower roll bearings 111, and the lower roll bearings 111 rotatably support respective opposite end portions of the lower roll shaft 107, and the lower roll support member 109 thereby rotatably supports the lower rolls 103 fixed to the lower roll shaft 107. The upper roll support member 110 includes upper roll bearings 112 and the upper roll bearings 112 rotatably support respective opposite end portions of the upper roll shaft 108, and the upper roll support member 110 rotatably supports the upper rolls 104 fixed to the upper roll shaft 108.

The plate material feeding device 101 includes a slider 117 that is movable in a horizontal direction along one of the lower roll support member 109 and the upper roll support member 110. In FIGS. 1 to 5, in order to make the upper roll support member 110 movable in the vertical direction, the slider 117 is movable in the horizontal direction along the upper roll support member 110; however, where the lower roll support member 109 is made to be movable in the vertical direction, the slider 117 is disposed so as to be movable in the horizontal direction along the lower roll support member 109. A hole 118 is provided in one of the upper roll support member 110 and the slider 117. Also, a rod 119 is provided in the other of the upper roll support member 110 and the slider 117. In FIGS. 1 to 5, the hole 118 is provided in the slider 117 and the rod 119 is provided in the upper roll support member 110; however, the hole 118 may be provided in the upper roll support member 110 and the rod 119 may be provided in the slider 117.

The rod 119 disposed in the hole 118 in such a manner that at least a part of the rod 119 and the hole 118 slidably engage with each other. When the slider 117 moves leftward in the horizontal direction as indicated by an arrow in FIG. 1, slidable engagement of at least a part of the rod 119 with the hole 118 enables the upper roll support member 110 to move downward in the vertical direction as indicated by an arrow in FIG. 1 and thus enables a plate material to be clamped by the lower rolls 103 and the upper rolls 104. When the slider 117 moves rightward in the horizontal direction as indicated by an arrow in FIG. 3, slidable engagement of at least one of the rod 119 with the hole 118 enables the upper roll support member 110 to move upward in the vertical direction as indicated by an arrow in FIG. 3 and thus enables a plate material clamped by the lower rolls 103 and the upper rolls 104 to be released.

Figure 2:
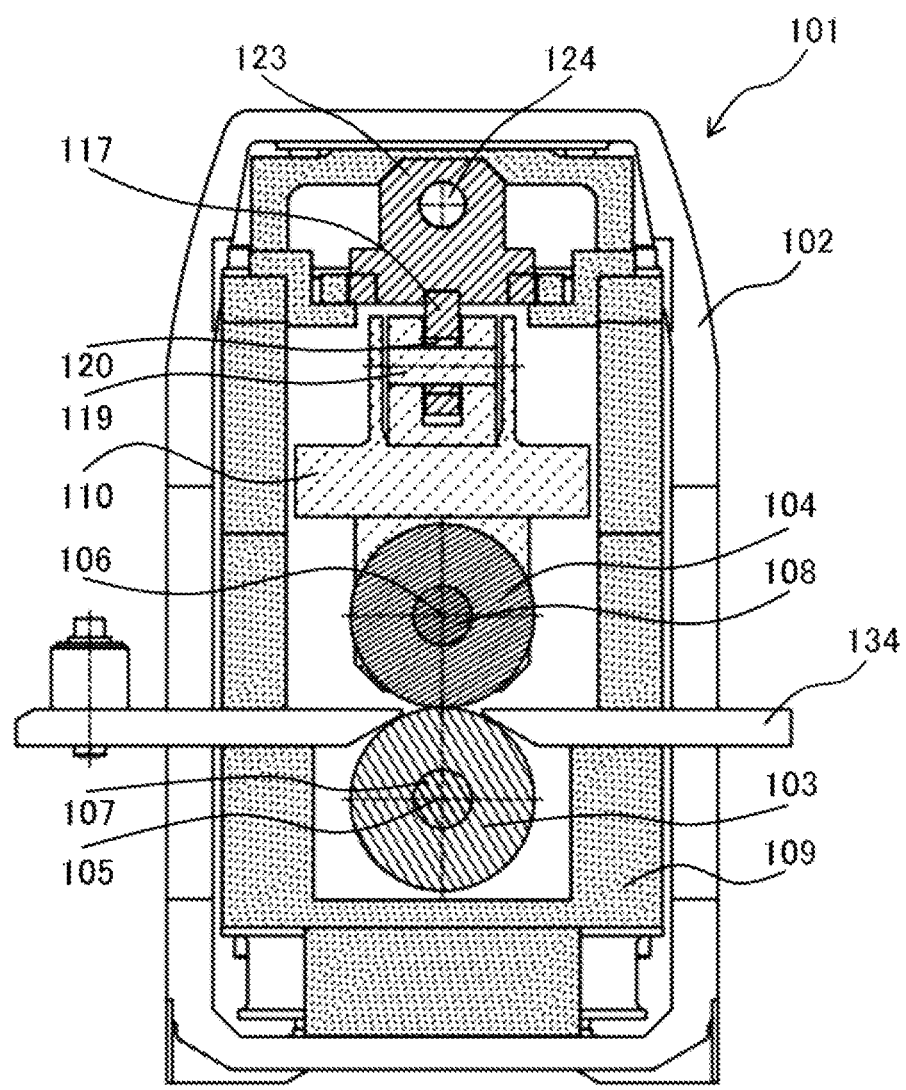
FIG. 2 is a schematic cross-sectional view of the plate material feeding device in FIG. 1 along dashed line II indicated in FIG. 1 as viewed from a lateral side.
Figure 3:
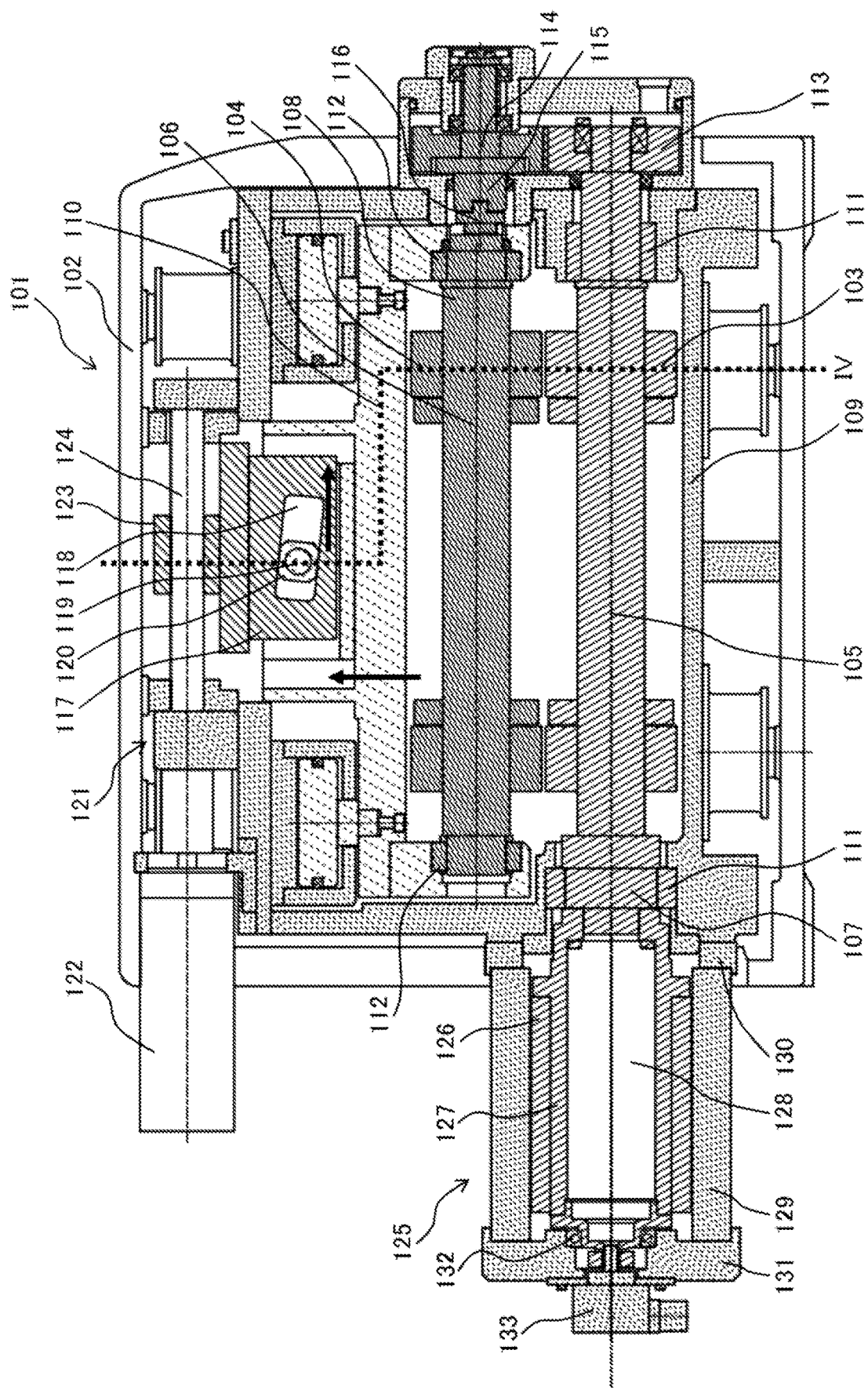
FIG. 3 is a schematic cross-sectional view of the plate material feeding device in FIG. 1 when releasing a plate material, as viewed from the front side.
Figure 4:
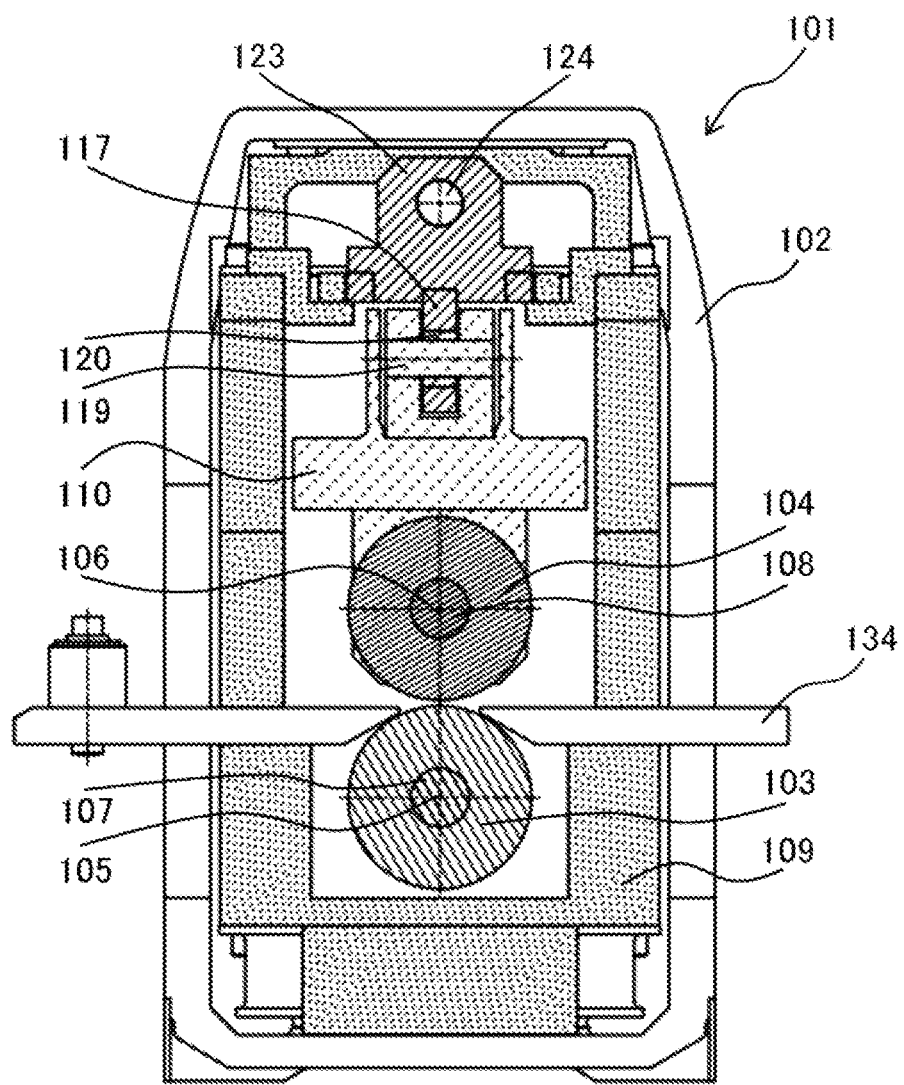
FIG. 4 is a schematic cross-sectional view of the plate material feeding device in FIG. 3 along dashed line IV indicated in FIG. 3 as viewed from a lateral side.
Figure 5:
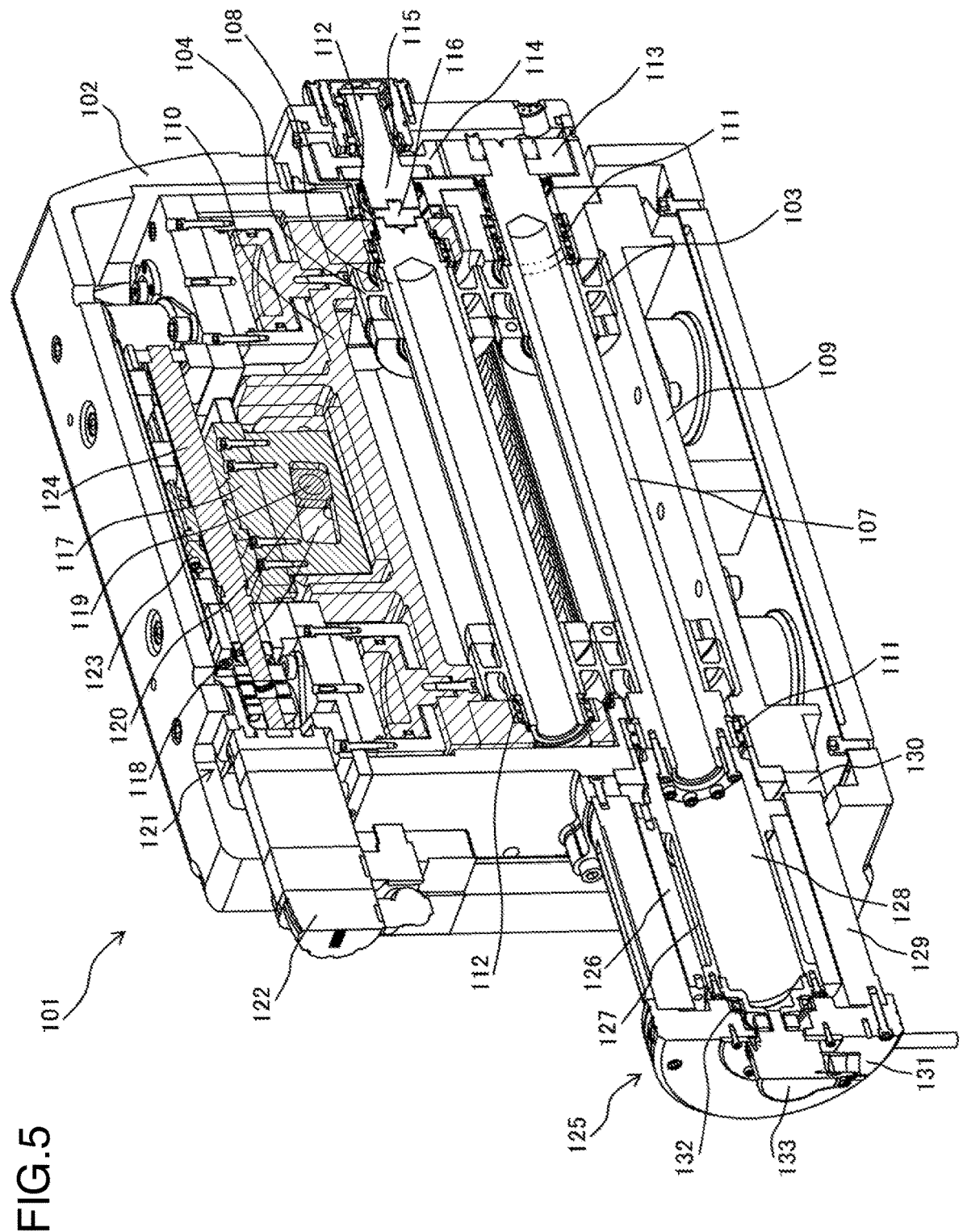
FIG. 5 is a schematic cross-sectional view of the plate material feeding device in FIG. 1 as viewed in an oblique direction.

The hole 118 may be a hole having a shape including inclined surfaces inclined in the horizontal direction, which is a direction in which the slider 117 moves. As illustrated in FIGS. 1 and 3, the hole 118 is, for example, a hole having a shape of a substantially rectangular parallelepiped in which a rectangular opening portion of the hole 118 is inclined relative to the horizontal direction, and two surfaces of the substantially rectangular parallelepiped thereby form the respective inclined surfaces of the hole 118. Since the rod 119 is in contact with and slides on the two inclined surfaces of the hole 118 having the substantially rectangular parallelepiped shape, when the slider 117 moves leftward in the horizontal direction as indicated by the arrow in FIG. 1, the upper roll support member 110 can move downward in the vertical direction as indicated by the arrow in FIG. 1, and when the slider 117 moves rightward in the horizontal direction as indicated by the arrow in FIG. 3, the upper roll support member 110 can move upward in the vertical direction as indicated by the arrow in FIG. 3. In FIGS. 2 and 4, the rod 119 extends through the slider 117 (hole 118), but the slider 117 does not necessarily need to extend through the slider 117 (hole 118). The same applies to the case where the hole 118 is provided in the upper roll support member 110.

When the slider 117 moves in the horizontal direction, at least a part of the rod 119 slides on the inclined surfaces of the hole 118, enabling the upper roll support member 110 to move in the vertical direction. In other words, movement in the horizontal direction of the slider 117 is converted into movement in the vertical direction of the upper roll support member 110 by sliding of the rod 119 relative to the hole 118.

The rod 119 may include a slide piece 120 having a substantially quadrangular cross-section. At least one end surface of the slide piece 120 is in contact with the inclined surfaces of the holes 118, enabling the slide piece 120 to slide on the inclined surfaces of the hole 118. Note that the slide piece 120 only needs to be able to ensure contact with the inclined surfaces of the hole 118 and does not necessarily need to have a substantially quadrangular cross-section but may have a polygonal or circular cross-section. Here, an angle of the inclined surfaces of the hole 118 relative to the horizontal direction is determined in consideration of, e.g., a grip force for gripping a plate material, the weight of the upper rolls 104 and the weight of the upper roll support member 110, responsiveness for clamping/releasing a plate material and a friction coefficient of friction caused by contact between the inclined surfaces and the rod 119.

The plate material feeding device 101 includes a horizontal movement mechanism 121 for making the slider 117 move in the horizontal direction. The slider 117 can move in the horizontal direction in response to horizontal movement caused by the horizontal movement mechanism 121. Examples of the horizontal movement mechanism 121 include, e.g., an air cylinder and an electric cylinder. The cylinder is moved in the horizontal direction by means of air or electricity, and according to such movement, the slider 117 connected to the cylinder can be moved in the horizontal direction. The examples of the horizontal movement mechanism 121 also include one formed by a screw shaft and a nut. Converting rotation around an axis of the screw shaft into linear motion of the nut enables the slider 117 connected to the nut to move in the horizontal direction.

The horizontal movement mechanism 121 may include a release motor 122. The horizontal movement mechanism 121 converts rotation of a rotor of the release motor 122 into movement in the horizontal direction, enabling the slider 117 to move in the horizontal direction.

The horizontal movement mechanism 121 may include a screw shaft 124 and a nut 123 that engages with the screw shaft 124. An end of the screw shaft 124 is joined to the rotor of the release motor 122, and when the rotor of the release motor 122 rotates, the screw shaft 124 rotates in response to the rotation. The rotation of the screw shaft 124 is converted into movement in the horizontal direction of the nut 123, enabling the slider 117 connected to the nut 123 to move in the horizontal direction.

A plurality of balls may be inserted between the screw shaft 124 and the nut 123 of the horizontal movement mechanism 121. In this case, what is called a ball screw is configured. When the screw shaft 124 rotates around an axis, the plurality of balls roll between the screw shaft 124 and the nut 123, enabling smooth horizontal movement of the nut 123 and thus enabling movement in the horizontal direction of the slider 117.

The plate material feeding device 101 in FIGS. 1 to 5 indicates that rotation of the screw shaft 124 caused by rotation of the rotor of the release motor 122 is converted into right-left reciprocating movement in the horizontal direction by the nut 123 and thus the slider 117 connected to the nut 123 reciprocates rightward and leftward in the horizontal direction. Then, right-left reciprocating movement in the horizontal direction of the slider 117 is converted into up-down reciprocating movement in the vertical direction by slidable engagement between the rod 119 provided in the upper roll support member 110 and the hole 118 provided in the slider 117, and thus the upper roll support member 110 reciprocates upward and downward in the vertical direction relative to the body housing 102, enabling a plate material to be clamped and released. Furthermore, a wedge effect between the rod 119 provided in the upper roll support member 110 and the hole 118 provided in the slider 117, the hole 118 including the inclined surfaces, enables the upper roll support member 110 to be reciprocated upward and downward in the vertical direction with a small grip force. Consequently, a drive force of the release motor 122 can be reduced, which leads to downsizing of the release motor and power consumption reduction. Here, right-left reciprocating movement in the horizontal direction of the slider 117 connected to the nut 123 may be converted into up-down reciprocating movement in the vertical direction of the lower roll support member 109 relative to the body housing 102 to enable the plate material to be clamped and released.

Also, in the plate material feeding device 101, an amount of rotation of the rotor of the release motor 122 is adjusted, enabling the nut 123 to be moved to an arbitrary position in the horizontal direction and enabling the upper roll support member 110 to be adjusted to an arbitrary height. Consequently, the plate material feeding device 101 enables adjusting the upper rolls 104 to an arbitrary height to release a plate material.

Also, in the plate material feeding device 101, a coupling unit 116 may be provided at a roll shaft to which at least one of the lower rolls 103 and the upper rolls 104 is fixed and the at least one roll may be movable in the vertical direction relative to the body housing 102 via the coupling unit 116. In FIGS. 1 to 5, the coupling unit 116 is provided at the upper roll shaft 108 with the upper rolls 104 fixed thereto and rotation of an upper roll gear 114 caused by rotation of a lower roll gear 113 is transmitted to the upper roll shaft 108, enabling the upper rolls 104 to be rotated via the coupling unit 116, and the upper rolls 104 are movable in the vertical direction relative to the body housing 102 via the coupling unit 116, enabling a plate material guided by the plate material guide 134 to be clamped and released. Here, instead of the upper roll gear 114, a second roll motor may be used to transmit rotation of a rotor of the second roll motor to the upper roll shaft 108 via the coupling unit 116 to enable the upper rolls 104 to rotate and enable the upper rolls 104 to move in the vertical direction relative to the second roll motor and the body housing 102 via the coupling unit 116.

The roll motor 125 is joined to the body housing 102 via an attachment plate 130 so that the lower rolls 103 can rotate along with rotation of a rotor 126 of the roll motor 125. Note that the rotor 126 is disposed in a hollow of a substantially cylindrical stator 129 and a shape of the rotor 126 may be a substantially cylindrical shape with a hollow provided therein. As a result of provision of a hollow 128 in the rotor 126, inertia moment of the rotor 126 can be reduced, enabling reduction of consumption of power (energy) used for rotating the rotor 126 itself. Consequently, in comparison with a motor including a rotor with no hollow provided therein, a plate material having large weight can be transported without an increase in size of the motor 102, enabling provision of a plate material feeding device 101 having high transportation capability.

In the hollow 128 provided in the rotor 126, a sleeve 127 is disposed so as to occupy a part of the hollow 128 of the rotor 126 and the sleeve 127 is thus joined to the rotor 126. The sleeve 127 joined to the rotor 126 rotates along with rotation of the rotor 126. In order to reduce inertia moment of the sleeve 127, a shape of the sleeve 127 is a substantially cylindrical shape with a hollow provided therein.

The sleeve 127 is joined to the lower rolls 103 via an end portion of the sleeve 127 and the lower roll shaft 107. The opposite ends of the lower roll shaft 107 are rotatably supported by the respective lower roll bearings 111 disposed on the lower roll support member 109, and the lower rolls 103 joined to the sleeve 127 rotate relative to the lower roll support member 109 along with rotation of the sleeve 127.

The roll motor 125 may include a motor housing 131 that houses a stator 129, at an end portion on the side opposite to an end portion on the side joined to the plate material feeding device 101. A roll motor bearing 132 may be provided in the motor housing 131 so as to be capable of supporting rotation of the rotor 126 and the sleeve 127 relative to the stator 129. Here, the motor housing 131 does not necessarily need to house the entire stator 129 but at least a part of the stator 129 may be in direct contact with external air. A part of the stator 129 being in direct contact with external air enables enhancement in efficiency of air cooling of the roll motor 125. Also, the roll motor 125 may include a rotation angle sensor 133 to enable measurement of a rotation angle of the rotor 126 and thus detection of a rotation speed. Examples of the rotation angle sensor 133 include a magnetic resolver and an optical encoder.

The plate material feeding device 101 may include a second roll motor. The second roll motor may have a structure that is the same as that of the roll motor 125 so that the second roll motor includes a substantially cylindrical stator including a hollow and a substantially cylindrical rotor including a hollow, the rotor being disposed in the hollow of the stator. The rotor of the second roll motor is joined to the upper rolls 104 via the upper roll shaft 108. The opposite ends of the upper roll shaft 108 are rotatably supported by the respective upper roll bearings 112 disposed in the upper roll support member 110, and the upper rolls 104 rotate relative to the upper roll support member 110 along with rotation of the rotor of the second roll motor. As described above, as a result of the motors being joined to the respective rolls so as to rotate the respective rolls, even if a rotation capacity of each motor is small, a plate material having large weight can be transported, enabling provision of a plate material feeding device 101 having high transportation capability.

Here, where the plate material feeding device 101 includes the second roll motor, the plate material feeding device 101 may include a control unit that receives a signal of the rotation speed of the rotor 126 detected by the rotation angle sensor 133 included in the roll motor 125 and a signal of a rotor rotation speed detected by a rotation angle sensor included in the second roll motor. The control unit determines whether or not the detected rotation speeds correspond to a predetermined rotation speed and controls the rotation speeds of the rotors of the respective motors, enabling the lower rolls 103 and the upper rolls 104 to be rotated in synchronization at the predetermined rotation speed.

In the plate material feeding device 101, the first gear (lower roll gear) 113 may be provided at the lower roll shaft 107 with the lower rolls 103 fixed thereto and the second gear (upper roll gear) 114 may be provided at the upper roll shaft 108 with the upper rolls 104 fixed thereto. The lower roll gear 113 and the upper roll gear 114 mesh and engage with each other and rotation of the lower roll gear 113 is thus transmitted to the upper roll gear 114. Consequently, the upper rolls 104 can rotate along with rotation of the lower rolls 103 caused by rotation of the rotor 126 of the roll motor 125. Note that in FIGS. 1 to 5, the lower roll gear 113 and the upper roll gear 114 are provided at the respective end portions, on the side opposite to the roll motor 125, of the lower roll shaft 107 and the upper roll shaft 108, respectively, but may be provided at the respective end portions, on the side that is the same as the side on which the roll motor 125 is provided, of the lower roll shaft 107 and the upper roll shaft 108, respectively. Transmission of rotation by the gears enables the lower rolls 103 and the upper rolls 104 to be rotated in synchronization.

Figure 6:
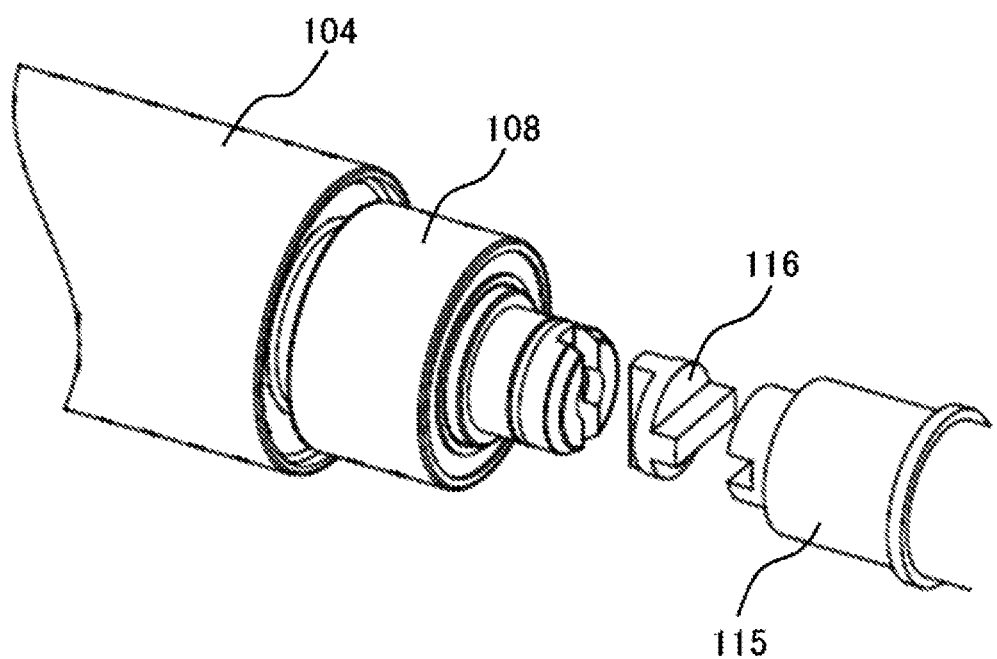
FIG. 6 is a perspective view indicating a relationship among a roll shaft, a coupling unit and a gear shaft, as an embodiment in the plate material feeding device in FIG. 1.

FIG. 6 is a perspective view indicating a relationship among the upper roll shaft 108 with the upper roll 104 fixed thereto, the coupling unit 116, and the upper roll gear shaft 115 with the upper roll gear 114 fixed thereto. In the plate material feeding device 101, the coupling unit 116 is provided at the upper roll shaft 108 with the upper roll 104 fixed thereto, and the upper roll shaft 108 and the upper roll gear shaft 115 are joined via the coupling unit 116. Moving the upper roll support member 110 in the vertical direction enables the upper roll 104 to move in the vertical direction relative to the body housing 102 via the coupling unit 116 without moving the upper roll gear 114 in the vertical direction relative to the body housing 102. In FIGS. 1 and 2, the upper roll support member 110 and the upper roll 104 are moved downward in the vertical direction relative to the body housing 102 so that a direction of the upper roll axis 106 of the upper roll shaft 108 and a direction of an axis of the upper roll gear shaft 115 are matched with each other via the coupling unit 116, to clamp a plate material. In FIGS. 3 and 4, the upper roll support member 110 and the upper roll 104 are moved upward in the vertical direction relative to the body housing 102 via the coupling unit 116 so that the direction of the upper roll axis 106 of the upper roll shaft 108 and the direction of the axis of the upper roll gear shaft 115 are made to be different from each other, to release a plate material. For the coupling unit 116, any unit that when a plate material is to be clamped, can move the upper roll 104 downward in the vertical direction via the upper roll shaft 108 and when a plate material is to be released, can move the upper roll 104 upward in the vertical direction via the upper roll shaft 108 may be employed. Examples of such coupling unit include an Oldham's coupling. The coupling unit 116 enables the upper roll 104 to be moved in the vertical direction without changing a position in the vertical direction of the upper roll gear 114 and thereby enables clamping and releasing of a plate material. Note that although in FIG. 6, the upper roll shaft 108 and the upper roll gear shaft 115 are joined via the coupling unit 116 because the upper roll support member 110 is moved in the vertical direction, where the lower roll support member 109 is moved in the vertical direction, the lower roll shaft 107 and a gear shaft of the lower roll gear 113 may be joined via the coupling unit 116 to move the lower rolls 103 in the vertical direction without changing a position in the vertical direction of the lower roll gear 113 and thereby enable a plate material to be clamped and released.

Use of the plate material feeding device 101 according to the present disclosure such as described above enables low power consumption and enables a plate material to be transported intermittently by increments with high precision. Then, a processing device such as a press device performs processing treatment, such as press working, of a plate material transported with high precision from the plate material feeding device 101, enabling manufacture of a structural object such as a small component used for information equipment such as a mobile phone or a personal computer.

It should be further understood by those skilled in the art that although the foregoing description has been made on the embodiments of the present disclosure, the present disclosure is not limited thereto and various changes and modifications may be made without departing from the spirit of the present disclosure and the scope of the appended claims.

What is claimed is:

1. A plate material feeding device comprising:
a housing;
a first roll housed in the housing and extending in a first direction;
a second roll housed in the housing and extending in the first direction;
a first roll support member that supports the first roll; and
a second roll support member that supports the second roll,
the plate material feeding device enabling a plate material to be clamped by the first roll and the second roll and be transported according to rotation of the first roll and the second roll, wherein:
the plate material feeding device includes a slider that is movable in the first direction;
a hole is provided in one of the first roll support member and the slider and a rod is provided in the other of the first roll support member and the slider; and
the hole is a hole including an inclined surface inclined relative to the first direction, and when the slider moves in the first direction, at least a part of the rod linearly moves along the inclined surface relative to the hole, whereby the first roll support member is configured to move relative to the second roll support member in a second direction perpendicular to the first direction.

2. The plate material feeding device according to claim 1, comprising a first motor for rotating the first roll, the first motor being joined to the first roll, and a second motor for rotating the second roll, the second motor being joined to the second roll.

3. The plate material feeding device according to claim 1, comprising a motor, being joined to the first roll, for rotating the first roll, a first gear provided at a first roll shaft to which the first roll is fixed, and a second gear provided at a second roll shaft to which the second roll is fixed,
wherein the first gear and the second gear engaging with each other enables the second roll to rotate along with rotation of the first roll by the motor, or
comprising a motor, being joined to the second roll, for rotating the second roll, a second gear provided at a second roll shaft to which the second roll is fixed, and a first gear provided at a first roll shaft to which the first roll is fixed, wherein the first gear and the second gear engaging with each other enables the first roll to rotate along with rotation of the second roll by the motor.

4. The plate material feeding device according to claim 2, wherein each of the first motor and/or the second motor includes a substantially cylindrical stator with a hollow provided therein and a substantially cylindrical rotor with a hollow provided therein, the rotor being disposed in the hollow of the stator.

5. The plate material feeding device according to claim 1, wherein the hole is a hole having a shape of a substantially rectangular parallelepiped and the at least a part of the rod is in contact with and slidable on two surfaces of the substantially rectangular parallelepiped, each of the two surfaces being the inclined surface.

6. The plate material feeding device according to claim 1, comprising a motor, wherein in response to rotation caused by the motor, the slider moves in the first direction.

7. The plate material feeding device according to claim 6, comprising a screw shaft that rotates in response to rotation caused by the motor and a nut that engages with the screw shaft, wherein the nut moving in the first direction along with rotation of the screw shaft enables the slider connected to the nut to move in the first direction.

8. The plate material feeding device according to claim 7, wherein rolling of a plurality of balls inserted between the screw shaft and the nut enables the slider to move in the first direction.

9. The plate material feeding device according to claim 1, wherein a coupling unit is provided at a roll shaft to which the first roll is fixed, and the first roll support member moving in the second direction enables the first roll to move in the second direction via the coupling unit.

* * * * *